United States Patent [19]

Kazyak

[11] Patent Number: 4,818,164

[45] Date of Patent: Apr. 4, 1989

[54] BODY PANEL MOUNTING RECEPTACLES

[75] Inventor: Lawrence P. Kazyak, Northville, Mich.

[73] Assignee: Ford Motor Company, Dearborn, Mich.

[21] Appl. No.: 59,094

[22] Filed: Jun. 8, 1987

[51] Int. Cl.4 .......................... F16B 39/02; E04B 1/38
[52] U.S. Cl. ...................................... 411/82; 411/508; 411/913; 411/182; 52/704
[58] Field of Search .................. 411/61, 82, 258, 182, 411/508–510, 913, 173; 52/704, 698

[56] References Cited

U.S. PATENT DOCUMENTS 2,283,122 5/1942 Murphy ............................ 411/913
2,632,615 3/1953 Churchill ......................... 411/508
2,857,754 10/1958 Reinert .............................. 52/704
3,221,572 12/1965 Swick ................................ 411/508

Primary Examiner—Neill R. Wilson
Attorney, Agent, or Firm—Daniel M. Stock; Clifford L. Sadler

[57] ABSTRACT

A receptacle is provided for receiving a plastic/adhesive used for mounting plastic body panels to a metallic subframe of an automobile in which the receptacle is formed through progressive die stamping from a cross formed blank. The receptacle is formed as truncated pyramidical shape and includes two sides with bent-over flanges for engaging the metallic subframe and two shorter sides which lock the receptacle to the subframe in snap-fit relationship after insertion into a square aperture.

8 Claims, 2 Drawing Sheets

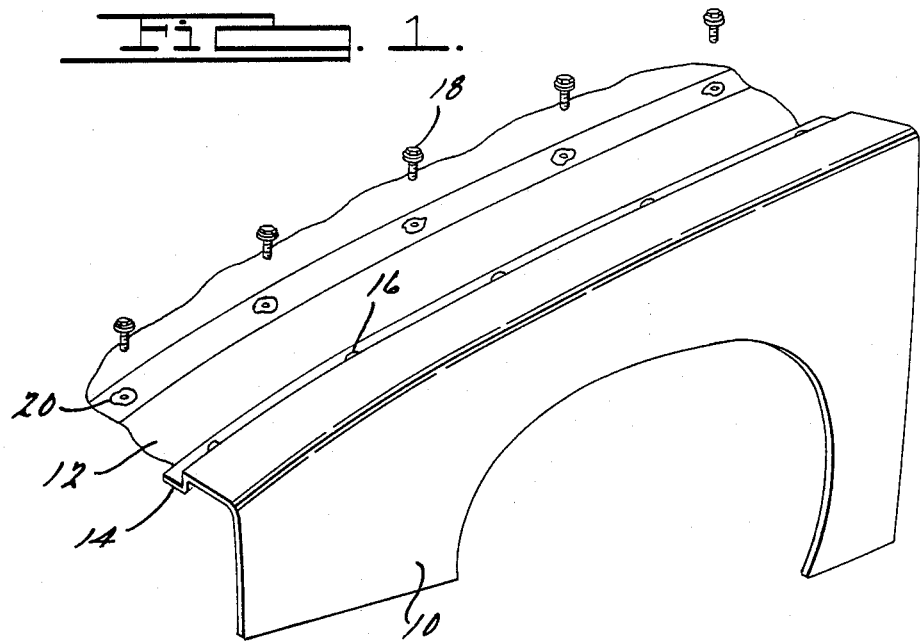
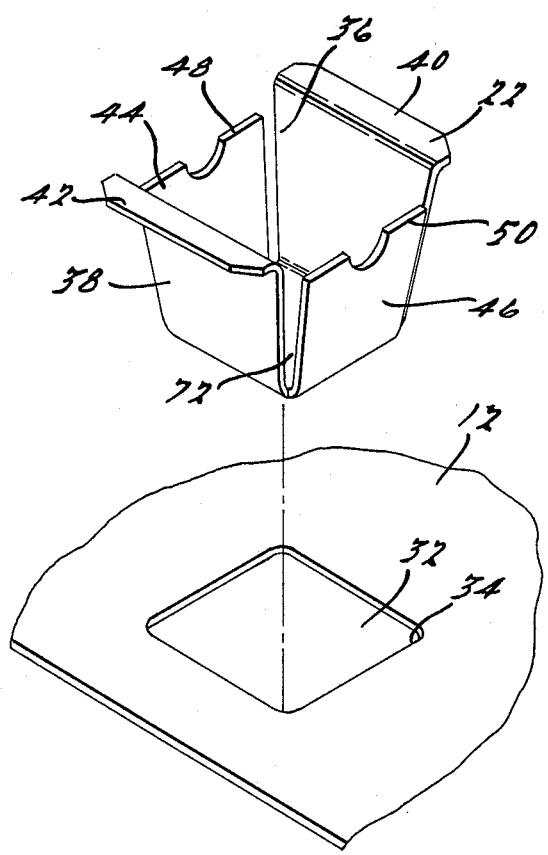

BODY PANEL MOUNTING RECEPTACLES

BACKGROUND OF THE INVENTION

The present invention relates to the assembly of external plastic body panels to automotive vehicles structural subframes. It relates more particularly to the formation of receptacles for carrying an intermediate plastic substance for locating securing the plastic body panels with respect to the subframe.

DESCRIPTION OF THE PRIOR ART

In a co-pending application filed of even date with the present application and assigned to the Assignee of the present invention, a method and apparati for accurately and efficiently mounting outer skin panels of an automobile to its structural subframe is described. The disclosure of that application is incorporated herein by reference.

The method and apparatus of the copending application includes a cup for insertion into a square aperture formed in the metallic subframe for receiving a plastic-/adhesive which is heat cured and formed to provide a locating surface and a fastener receiving aperture in a single operation.

The present invention comprises an alternate configuration of the cup disclosed in the co-pending application, and the applicant in this application is one of the applicants in the co-pending application.

SUMMARY OF THE INVENTION

According to the present invention, a metallic receptacle is provided for receiving a plastic/adhesive substance which is advantageously formed through progressive stamping from a blank generally in the form of a Maltese cross. After final stamping operations, the receptacle assumes the shape of a truncated four-sided pyramid. This receptacle has been found to be advantageous in that the stamping process provides low-cost good dimensional repeatability. Torque reaction to fastener insertion and removal is enhanced by the cooperation of the square cross-sectioned pyramid in the square hole of the metallic subframe. The receptacles tend to be self-locating owing to the tapered shape which facilitates the use of robotic assembly. Further, since the receptacle in its to-be-assembled form is configured to snap in to the mating aperture, the robotic assembly is likewise enhanced while the shape of the receptacles provides stackability for storage and magazine feeding to robots while the flanges formed on the receptacle provide gripping surfaces for robot and defectors.

All of these features are accomplished while maintaining the desirable functions referred to in the co-pending application, including the effecting of good adhesive bonding of the receptacle to the metallic subframe through the provision of open areas in the receptacle such as those defined between the arms of the cross blank for allowing the flow of plastic/adhesive excess out of the internal area of the receptacle into contact with the metallic subframe.

BRIEF DESCRIPTION OF THE DRAWINGS

These and other features will become apparent to those skilled in the automotive assembly arts by reading the following description with reference to the accompanying drawings in which:

FIG. 1 is a perspective exploded view of an automobile fender as it is to be installed on a vehicle subframe;

FIG. 2 is a perspective exploded view of the receptacle of the present invention as it is aligned to be inserted into an aperture in the vehicle subframe;

DESCRIPTION OF A PREFERRED EMBODIMENT

Figure 6:
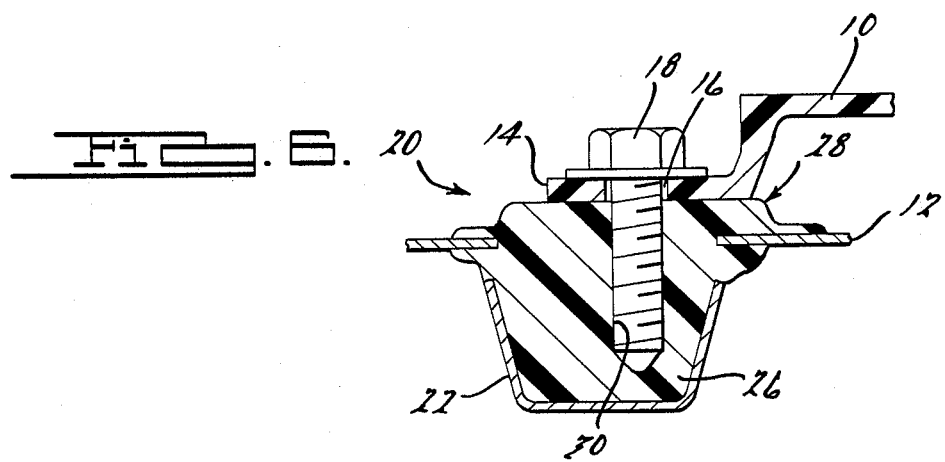
FIG. 6 is a cross-sectional view illustrating the assembly of plastic body panel onto a metallic subframe through agency of the receptacle of the present invention.

Turning now to the drawings and in particular to FIG. 1 thereof, a plastic automotive fender 10 is illustrated as being installed on a metallic subframe 12. The fender 10 includes a flange portion 14 pierced by clearance holes 16 for receiving threaded fasteners indicated at 18. Fastening and positioning devices 20 are carried in the metallic subframe 12 in registration with clearance holes 16. The fastening and positioning device 20, as may best be seen in FIG. 6, includes a receptacle 22 for receiving a thixotropic plastic/adhesive substance 26 which is heat cured in situ to form an accurately positioned mounting surface 28 for supporting the flange portion 14 of the automotive fender 10 while providing an aperture 30 for receiving the fasteners 18 and adhesively engaging the metallic subframe 12.

The receptacle 22 of the present invention enhances the desirable function of the positioning and fastening assembly 20 by virtue of its configuration as shown in FIGS. 2–5.

In FIG. 2, the receptacle 22 is illustrated as it is positioned to be inserted into an aperture 32 formed in the metal subframe 12, the aperture 32 having rounded corners 34. As can be seen in the perspective view of FIG. 2, the receptacle 20 is generally of four-sided truncated pyramidical shape. It has a pair of opposed sides 36, 38 having turned-over flanged portions 40, 42, respectively. Intermediate the opposed sides 36, 38 are an additional pair of smaller opposed sides 44, 46 which terminate at their free ends in notched outer surfaces 48, 50 respectively.

Figure 3:
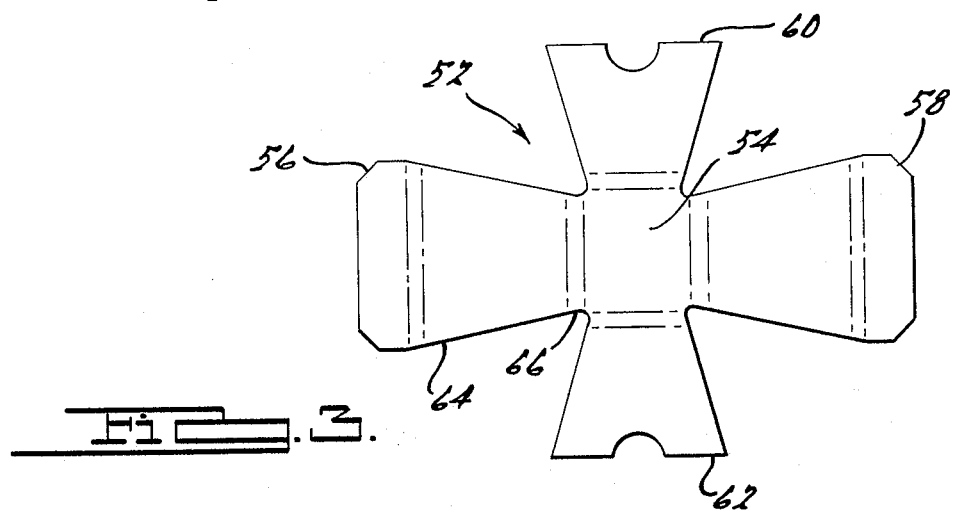
FIG. 3 is a plan view of the form of the blanking pattern of the receptacle of the present invention.
Figures 4, 5:
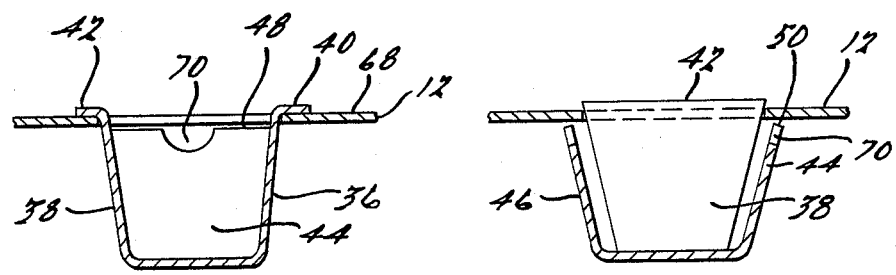
FIG. 4 is a cross-sectional view illustrating the receptacle of the present invention inserted into the vehicle subframe.
FIG. 5 is a cross-sectional view similar to FIG. 6 taken rotated 90° from the position of the section of FIG. 4.

The configuration of the receptacle 20 is made possible through its fabrication using a progressive die applied to a blank of the sort illustrated in FIG. 3. The blank 52 includes a base portion 54 from which major arms 56, 58 and minor arms 60, 62 extend. The blank 52 is formed as shown in FIG. 3 in the first application of a stamping die to define the illustrated shape and to define bend areas as indicated at 64, 66 for enhancing formation of the final shape shown in FIG. 2. Insertion of the receptacle 20 so formed into metallic subframe 12 as shown in FIGS. 4 and 5 presents a pocket for application of the plastic/adhesive 26. In FIG. 4 it can be seen that the turned-over flange portions 40, 42 of the receptacle 20 abuttingly engage the upper surface 68 of the metallic subframe 12, the notched free end 50 formed from the minor arm 60 on the other hand is free from contact with the metallic subframe 12. The notch 70 enhances overflow of the plastic/adhesive 26 as may best be seen in FIG. 6, and the outward positioning of the smaller opposed walls 44, 46 formed from minor arms 60, 62 permits snap-fit insertion of the receptacle 20 into the aperture 32 formed in the metallic subframe 12.

It can be appreciated then by reference to the figures that insertion of the receptacle 20 into the aperture 32 effects positioning of the receptacle against the metallic subframe 12 through agency of the turned-over flange portions 40,42. Rotational displacement of the receptacle is resisted by the cooperation of the generally square cross-section of the receptacle 20 as it cooperates with the square aperture 32 and metallic subframe 12, and the adhesive connection between the receptacle 20 and the metallic subframe 12 is enhanced by the provision of the notches 70 and the smaller arms 44, 46 of the receptacle 20. It is also enhanced by the gaps such as indicated at 72 in FIG. 1 defined between the adjacent surfaces between pairs of smaller and larger arms, such as 38, 46.

While only one embodiment of the receptacle of the present invention has been described here, others may be possible without departing from the scope of the appended claims.

What is claimed is:

1. In an apparatus for mounting plastic body panels on metallic subframes of automobiles of the type wherein a plurality of square apertures is formed in the metallic subframe into which cups are inserted for receiving a plastic/adhesive substance to be heat cured in situ for defining a mounting surface for the body panel, the improvement wherein the cup is formed as a unitary four-sided truncated pyramidical structure having:
   a rectangular imperforate base portion;
   a pair of mounting sides extending from opposite sides of the rectangular base portion, each having a turned-over flange portion abuttingly engageable with the metallic subframe adjacent the aperture;
   a pair of locking sides arranged in opposed relationship extending from the remaining opposed ends of the rectangular base portion and being fabricated to normally extend in an outwardly canted direction with respect to the base portion to position the free ends thereof beyond the inner periphery of the subframe aperture, whereby insertion of the cup into the aperture operates to deflect the locking sides inwardly to permit insertion through the aperture whereupon the locking sides spring outwardly to resist removal of the receptacle from the aperture.

2. An improved mounting apparatus as defined in claim 1, wherein said locking sides and said mounting sides are configured to prevent contact therebetween thereby defining diverging gaps running longitudinally of the cup.

3. An improved mounting apparatus as defined in claim 1 wherein the cup is formed from a blank of cross-shaped configuration.

4. An improved mounting apparatus as defined in claim 1, wherein said cup is formed as a stamping from a cross-shaped blank having first and second opposed pairs of arms for forming said mounting and locking sides, said first and second pairs of arms being different in length.

5. An improved mounting apparatus as defined in claim 1 wherein said base portion is imperforate.

6. In an apparatus for mounting plastic body panels on metallic subframes of automobiles of the type wherein a plurality of square apertures is formed in the metallic subframe into which cups are inserted for receiving a plastic/adhesive substance to be heat cured in situ for defining a mounting surface for the body panel, the improvement wherein the cup is formed as a unitary four-sided truncated pyramidical structure having:
   a rectangular base portion;
   a pair of mounting sides extending from opposite sides of the rectangular base portion, each having a turned-over flange portion abuttingly engageable with the metallic subframe adjacent the aperture;
   a pair of locking sides arranged in opposed relationship extending from the remaining opposed ends of the rectangular base portion, having notches formed on the free ends thereof and being fabricated to normally extend in an outwardly canted direction with respect to the base portion to position the free ends thereof beyond the inner periphery of the subframe aperture, whereby insertion of the cup into the aperture operates to deflect the locking sides inwardly to permit insertion through the aperture whereupon the locking sides spring outwardly to resist removal of the cup from the aperture.

7. In an apparatus for mounting plastic body panels on metallic subframes of automobiles of the type wherein a plurality of square apertures is formed in the metallic subframe into which cups are inserted for receiving a plastic/adhesive substance to be heat cured in situ for defining a mounting surface for the body panel, the improvement wherein the cup is formed as a unitary four-sided truncated pyramidical structure having:
   a rectangular base portion;
   a pair of mounting sides extending from opposite sides of the rectangular base portion, each having a turned-over flange portion abuttingly engageable with the metallic subframe adjacent the aperture;
   a pair of locking sides arranged in opposed relationship extending from the remaining opposed ends of the rectangular base portion, having through apertures formed adjacent the free ends thereof and being fabricated to normally extend in an outwardly canted direction with respect to the base portion to position the free ends thereof beyond the inner periphery of the subframe aperture, whereby insertion of the cup into the aperture operates to deflect the locking sides inwardly to permit insertion through the aperture whereupon the locking sides spring outwardly to resist removal of the cup from the aperture.

8. In an apparatus for mounting plastic body panels on metallic subframes of automobiles of the type wherein a plurality of square apertures is formed in the metallic subframe into which cups are inserted for receiving a plastic/adhesive substance to be heat cured in situ for defining a mounting surface for the body panel, the improvement wherein the cup is formed as a unitary four-sided truncated pyramidical structure having:
   a rectangular base portion;
   a pair of mounting sides extending from opposite sides of the rectangular base portion, each having a turned-over flange portion abuttingly engageable with the metallic subframe adjacent the aperture;
   a pair of locking sides arranged in opposed relationship extending from the remaining opposed ends of the rectangular base portion, defining with the mounting sides gaps running longitudinally of the cup, having through apertures formed adjacent the free ends thereof and being fabricated to normally extend in an outwardly canted direction with respect to the base portion to position the free ends thereof beyond the inner periphery of the subframe aperture, whereby insertion of the cup into the aperture operates to deflect the locking sides inwardly to permit insertion through the aperture whereupon the locking sides spring outwardly to resist removal of the cup from the aperture.

* * * * *